US012583711B2

(12) United States Patent
Appana, Jr.

(10) Patent No.: US 12,583,711 B2
(45) **Date of Patent: *Mar. 24, 2026**

(54) SYSTEMS AND METHODS FOR DETERMINING ELEVATOR LOADS

(71) Applicant: Appana Industries LLC, Jamaica, NY (US)

(72) Inventor: Amarnauth Appana, Jr., Jamaica, NY (US)

(73) Assignee: Appana Industries LLC, Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,440

(22) Filed: Nov. 4, 2024

(65) Prior Publication Data

US 2025/0058995 A1 Feb. 20, 2025

Related U.S. Application Data

(63) Continuation of application No. 17/719,216, filed on Apr. 12, 2022.

(Continued)

(51) Int. Cl.
*B66B 1/34* (2006.01)
*B66B 1/44* (2006.01)

(52) U.S. Cl.
CPC .......... *B66B 1/3423* (2013.01); *B66B 1/3476* (2013.01); *B66B 1/3492* (2013.01); *B66B 1/44* (2013.01)

(58) Field of Classification Search
CPC ....... B66B 1/3476; B66B 1/3492; B66B 5/00; B66B 5/0006; B66B 5/0037; B66B 5/14; B66B 5/145
See application file for complete search history.

(56) References Cited

U.S. PATENT DOCUMENTS 5,631,452 A 5/1997 Jamieson et al.
5,889,239 A * 3/1999 Blackaby .................. B66B 1/30 187/394

(Continued)

FOREIGN PATENT DOCUMENTS

CN 102887403 A 1/2013
CN 103863903 A 6/2014

(Continued)

OTHER PUBLICATIONS

Extended European Search report issued on Aug. 23, 2022 in counterpart European Patent Application No. 22166654.8 (9 pages, in English).

(Continued)

*Primary Examiner* — Christopher Uhlir
(74) *Attorney, Agent, or Firm* — Bookoff McAndrews, PLLC

(57) ABSTRACT

A method for dispatching an elevator car that includes determining the elevator car is located at a first location of a plurality of locations, and a predefined positional count corresponds to each of the plurality of locations. The method includes determining a positional count of the elevator car at the first location, and determining a load of the elevator car at the first location based on a difference between the positional count and the predefined positional count corresponding to the first location. The method includes controlling an operation of the elevator car based on the load of the elevator car at the first location.

19 Claims, 5 Drawing Sheets

Related U.S. Application Data

(60) Provisional application No. 63/174,284, filed on Apr. 13, 2021.

(56) References Cited

U.S. PATENT DOCUMENTS

| | | | | |
|---|---|---|---|---|
| 6,305,503 | B1 * | 10/2001 | Suzuki | B66B 1/3476 187/393 |
| 9,079,751 | B2 * | 7/2015 | Sundholm | B66B 3/00 |
| 9,573,789 | B2 * | 2/2017 | Appana | B66B 1/2408 |
| 2010/0300815 | A1 | 12/2010 | Stolt et al. | |
| 2015/0274485 | A1 | 10/2015 | Appana | |
| 2018/0093866 | A1 * | 4/2018 | Weibel | B66B 11/043 |
| 2022/0324674 | A1 * | 10/2022 | Appana, Jr. | B66B 3/002 |

FOREIGN PATENT DOCUMENTS

| | | | | |
|---|---|---|---|---|
| CN | 105980284 | A | 9/2016 | |
| CN | 106414293 | A | 2/2017 | |
| CN | 106715309 | A | 5/2017 | |
| CN | 106829660 | A | 6/2017 | |
| CN | 107697754 | A | 2/2018 | |
| CN | 110775740 | A | 2/2020 | |
| GB | 2324170 | A | 10/1994 | |
| JP | 2008-044680 | A | 2/2008 | |
| JP | 2008290805 | A | 12/2008 | |
| JP | 2010-195529 | A | 9/2010 | |
| JP | 2011157161 | A | 8/2011 | |
| JP | 2019-094157 | A | 6/2019 | |
| WO | 2016040568 | A1 | 3/2016 | |
| WO | WO-2016091919 | A1 * | 6/2016 | B66B 1/3476 |

OTHER PUBLICATIONS

Japanese Office Action issued on Apr. 25, 2023 in counterpart Japanese Patent Application No. 2022-065085 (15 pages, with English translation).

* cited by examiner

SYSTEMS AND METHODS FOR DETERMINING ELEVATOR LOADS

CROSS-REFERENCE TO RELATED APPLICATIONS

This application is a continuation of U.S. application Ser. No. 17/719,216, filed on Apr. 12, 2022, which claims the benefit of priority from U.S. Provisional Application No. 63/174,284, filed on Apr. 13, 2021, which are incorporated by reference in their entireties.

TECHNICAL FIELD

Aspects of the present disclosure relate generally to systems and methods for controlling elevator traffic flow, and specifically to examples of elevator control systems that dispatch elevator cars based on a travel duration relative to a group of elevator cars.

DESCRIPTION OF RELATED TECHNOLOGY

Elevator systems may generally employ a dispatch methodology based on a load of an elevator car. In such systems, an estimated load of each elevator car may be determined with one or more devices mounted within the hoistway (i.e. elevator shaft) of the elevator car. The one or more devices may include sensors or encoders that detect a weight of the elevator car. In some instances, the devices mounted in the hoistway of the elevator car may be costly, require repair or recurring manual calibration to maintain accuracy, and generally difficult to access. Further, such load-weighing devices may malfunction under certain conditions where determining the weight of the elevator car may be imperative, such as during emergency situations (e.g., a fire). Providing a system capable of determining an occupancy weight of elevator cars without requiring the installation of load-weighing devices mounted within the hoistway of each elevator car may provide numerous advantages, including dispatching elevator cars to prospective passengers based on the occupancy weight of the elevator car, thereby increasing traffic flow and decreasing wait times for prospective passengers.

BRIEF DESCRIPTION OF DRAWINGS

The accompanying drawings, which are incorporated in and constitute a part of this disclosure, illustrate various exemplary embodiments and together with the description, serve to explain the principles of the disclosure.

Aspects of the disclosure may be implemented in connection with embodiments illustrated in the attached drawings. These drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure. There are many aspects and embodiments described herein. Those of ordinary skill in the art will readily recognize that the features of a particular aspect or embodiment may be used in conjunction with the features of any or all of the other aspects or embodiments described in this disclosure.

SUMMARY

Figure 1:
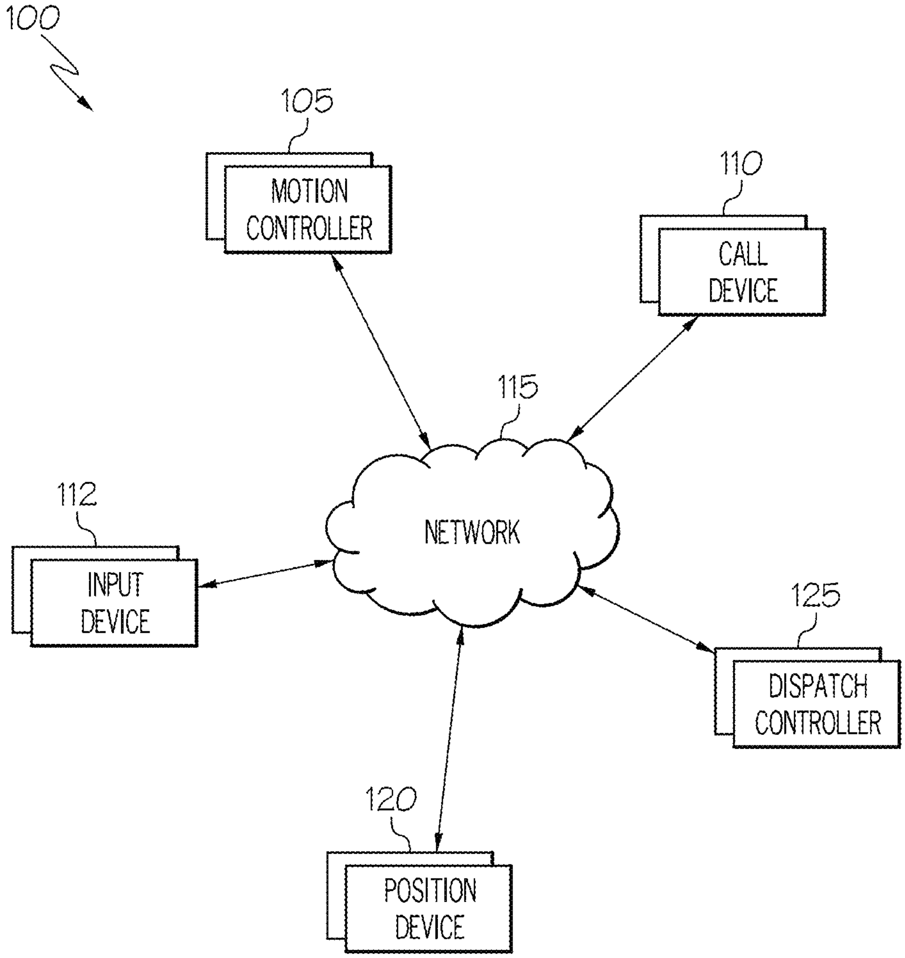
FIG. 1 depicts a dispatch system including one or more devices in communication over a network.

According to an example, a method for dispatching an elevator car includes determining the elevator car is located at a first location of a plurality of locations, wherein a predefined positional count corresponds to each of the plurality of locations; determining a positional count of the elevator car at the first location; determining a load of the elevator car at the first location based on a difference between the positional count and the predefined positional count corresponding to the first location; and controlling an operation of the elevator car based on the load of the elevator car at the first location.

According to another example, a system for dispatching an elevator car includes at least one position device operably coupled to a plurality of elevator cars, the at least one position device is configured to determine a positional count of each of the plurality of elevator cars when located at one of a plurality of locations; and at least one dispatch controller operably coupled to the at least one position device of the plurality of elevator cars, the at least one dispatch controller is configured to: determine a load of a first elevator car of the plurality of elevator cars based on the positional count of the first elevator car when located at a first location of the plurality of locations; and control an operation of the first elevator car based on the load of the first elevator car when located at the first location.

According to a further example, a system for dispatching a plurality of elevators cars includes a processor; and a memory storing instructions that, when executed by the processor, causes the processor to perform operations including: determine a first elevator car of the plurality of elevator cars is located at a first location of a plurality of locations, wherein each of the plurality of locations includes a corresponding predefined positional count; determine a positional count of the first elevator car at the first location; determine a load of the first elevator car based on a difference between the positional count and the predefined positional count corresponding to the first location; and operate the first elevator car based on the load of the first elevator car at the first location.

DETAILED DESCRIPTION

The dispatch system of the present disclosure may be in the form of varying embodiments, some of which are depicted by the figures and further described below.

Both the foregoing general description and the following detailed description are exemplary and explanatory only and are not restrictive of the features, as claimed. As used herein, the terms “comprises,” “comprising,” or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range+/−10%.

FIG. 1 shows an exemplary dispatch system 100 that may include motion controller 105, call device 110, position device 120, and dispatch controller 125. The one or more devices of dispatch system 100 may communicate with one another across a network 115 and in any arrangement. For example, the devices of dispatch system 100 may be communicatively coupled to one another via a wired connection, a wireless connection, or the like. In some embodiments, network 115 may be a wide area network ("WAN"), a local area network ("LAN"), personal area network ("PAN"), etc. Network 115 may further include the Internet such that information and/or data provided between the devices of dispatch system 100 may occur online (e.g., from a location remote from other devices or networks coupled to the Internet). In other embodiments, network 115 may utilize Bluetooth® technology and/or radio waves frequencies.

Motion controller 105 may be operably coupled to a transportation unit and configured to detect and transmit motion data of the transportation unit to one or more devices of dispatch system 100, such as, for example, dispatch controller 125. For example, motion controller 105 may measure and record one or more parameters (e.g., motion data) of the transportation unit, including, but not limited to, a current location, a travel direction, a travel speed, a door location, a status, and more. Motion controller 105 may include a computing device having one or more hardware components (e.g., a processor, a memory, a sensor, a communications module, etc.) for generating, storing, and transmitting the motion data. As described in further detail herein, motion controller 105 may be operably coupled to an elevator car located within a building, and dispatch system 100 may include at least one motion controller 105 for each elevator car.

Still referring to FIG. 1, call device 110 may be positioned outside the transportation unit and configured to receive a user input from one or more prospective occupants for accessing the transportation unit. For example, the user input may be indicative of a call requesting transportation from the transportation unit. Call device 110 may be configured to transmit the call request to one or more devices of dispatch system 100, such as, for example, dispatch controller 125. Call device 110 may include a keypad, a touchscreen display, a microphone, a button, a switch, etc. Call device 110 may be further configured to receive a user input indicative of a current location of the call request (e.g., a first location) and/or a destination location from a plurality of locations.

As described in further detail herein, call device 110 may be located within a building, and dispatch system 100 may include at least one call device 110 for each floor of the building. Call device 110 may be configured to transmit a message from one or more devices of dispatch system 100 (e.g., dispatch controller 125) identifying an elevator car assigned to arrive at the floor of the building to answer the call request. The message may be communicated by call device 110 via various suitable formats, including, for example, in a written form, an audible form, a graphic form, and more.

Input device 112 may be positioned inside the transportation unit, and configured to receive a user input from one or more occupants of the transportation unit. For example, the user input may be indicative of a command requesting redirection of the transportation unit. Input device 112 may be configured to transmit the command to one or more devices of dispatch system 100, such as, for example, dispatch controller 125. Input device 112 may include a keypad, a touchscreen display, a microphone, a button, a switch, etc. As described in detail herein, input device 112 may be located within an elevator car, and dispatch system 100 may include at least one input device 112 for each elevator car in a building. In other embodiments, input device 112 may be omitted entirely from dispatch system 100.

Still referring to FIG. 1, position device 120 may be positioned outside the transportation unit, and configured to detect and transmit data (e.g., positional counts) of the transportation unit to one or more devices of dispatch system 100, such as, for example, dispatch controller 125. For example, position device 120 may measure and record a positional count in response to the transportation unit arriving to at least one of a plurality of locations. Position device 120 may include a computing device having one or more hardware components (e.g., a processor, a memory, a sensor, a communications module, etc.) for generating, storing, and transmitting the positional count data.

As described in further detail herein, position device 120 may be operably coupled to one or more motion controllers 105 of elevator cars located within a building, and dispatch system 100 may include at least one position device 120 for each elevator car. In other examples, one position device 120 may be operably coupled to a plurality of elevator cars located within a building, and dispatch system 100 may include at least one position device 120 for each building. Position device 120 may be configured to detect and/or measure an offset of an elevator car from a location (floor) within the building at which the elevator car is positioned. The offset of the elevator car may be indicative of an occupancy weight of the elevator car, which may include a current load within the cabin from one or more occupants, personal belongings, luggage, baggage, and more.

Dispatch controller 125 may be positioned outside the transportation unit, and configured to receive data (e.g., motion data, a call request, a redirection command, positional count data, etc.) from one or more devices of dispatch system 100. Dispatch controller 125 may be further configured to determine at least one transportation unit of a plurality of transportation units to dispatch in response to receiving a call request from a prospective passenger seeking transportation. Dispatch controller 125 may include a computing device (see FIG. 4) operable to perform one or more processes (see FIG. 5) for dispatching at least one transportation unit to pick up a prospective passenger based on at least the positional count data. As described in further detail herein, dispatch controller 125 may be operably coupled to a plurality of elevator cars located within a building, and dispatch system 100 may include at least one dispatch controller 125 for each building.

Figure 2:
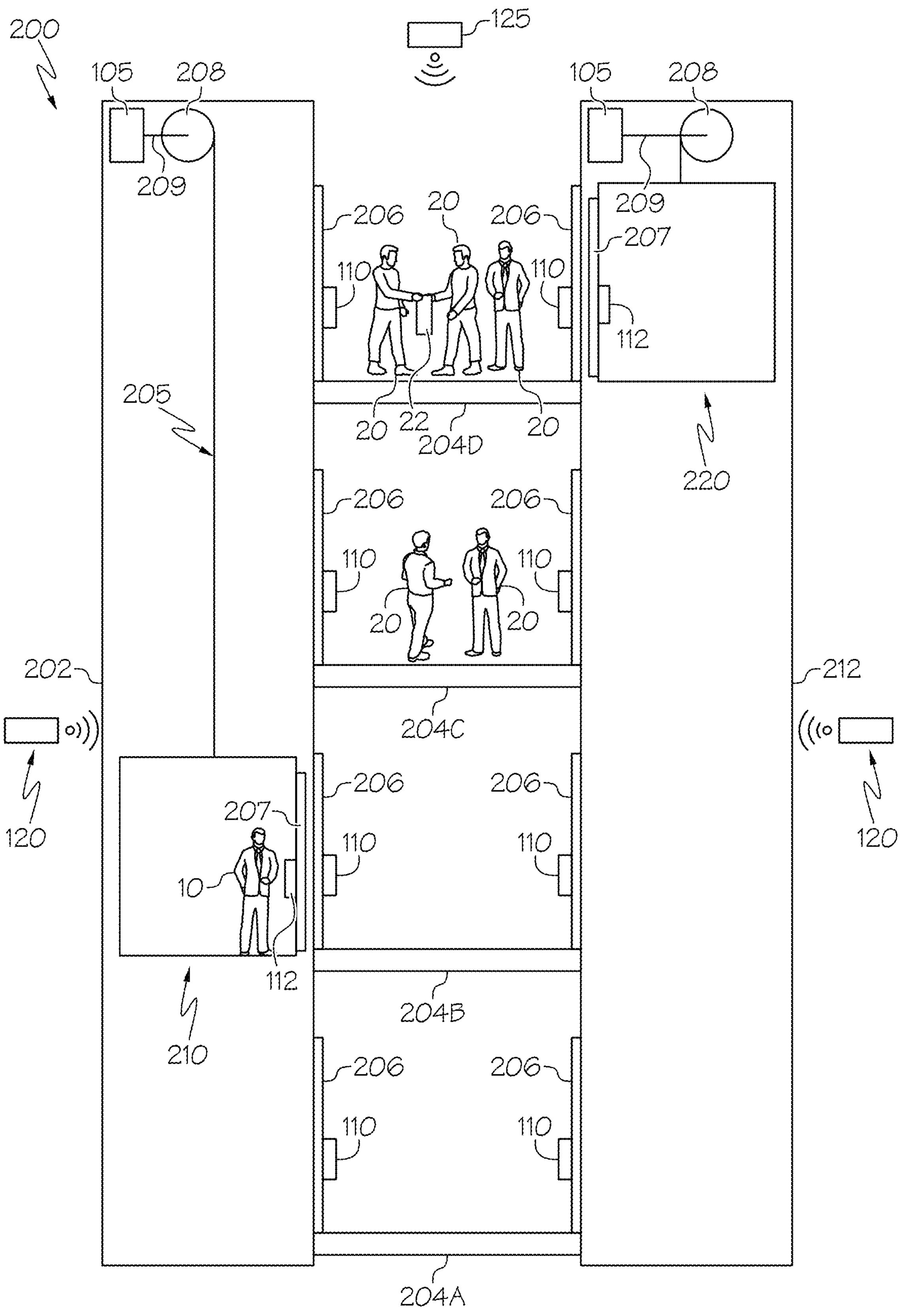
FIG. 2 is a schematic view of a working environment including multiple elevator cars at different locations interacting with the dispatch system shown in FIG. 1.

Referring now to FIG. 2, dispatch system 100 may be utilized in a working environment 200, such as a building (e.g., a facility, a factory, a store, a school, a house, an office, and various other structures). In the example, the transportation unit may include one or more elevator cars within the building. It should be appreciated that working environment 200 is merely illustrative such that dispatch system 100 may be utilized in various other suitable environments than those shown and described herein without departing from a scope of this disclosure. In the example, working environment 200 may include a plurality of floors defining a plurality of locations within the building, such as first floor 204A, second floor 204B, third floor 204C, and fourth floor 204D. It should be appreciated that, in other embodiments, the building of working environment 200 may include additional and/or fewer floors.

Working environment 200 may further include one or more elevator shafts (i.e. a hoistway) with at least one elevator car positioned within each elevator shaft. In the example, working environment 200 may include a first elevator shaft 202 with at least one first elevator car 210, and a second elevator shaft 212 with at least one second elevator car 220. Each elevator shaft 202, 212 may be located at a different location on each of the plurality of floors 204A-204D. Stated differently, first elevator shaft 202 may be located at a first location "A," second elevator shaft 212 may be located at second location "B" that is different than the first location "A," on each of the plurality of floors 204A-204D. Although not shown, it should be appreciated that working environment 200 may include additional (e.g., a plurality) elevator shafts, elevator cars, and locations at which said elevator shafts and elevator cars are located. Accordingly, it should be appreciated that working environment 200 may include a plurality of first elevator shafts 202 including a plurality of first elevator cars 210, and a plurality of second elevator shafts 212 including a plurality of second elevator cars 220, and more.

Each elevator car 210, 220 may be coupled to a lift mechanism configured to move elevator cars 210, 220 within elevator shafts 202, 212 and relative to floors 204A-204D. In the example, the lift mechanism of working environment 200 may include at least one pulley system 208 located within each elevator shaft 202, 212, and secured to each elevator car 210, 220 located therein. It should be understood that pulley system 208 may include various mechanical and/or electrical mechanisms for moving elevator cars 210, 220 within elevator shafts 202, 212, including but not limited to, a motor, a cable, a counterweight, a sheave, etc.

In the example, each pulley system 208 may include a cable assembly 205 coupled to each elevator car 210, 220. Cable assembly 205 may be configured to raise and lower elevator cars 210, 220 relative to elevator shafts 202, 212, respectively. Cable assembly 205 may include various suitable devices, including but not limited to, a sealed strand, a plurality of wires, a plurality of ropes, and more. Further, cable assembly 205 may be formed of various materials, such as a metal (steel) and/or other composites. In some embodiments, cable assembly 205 may be at least partially flexible, such that cable assembly 205 may stretch and/or extend longitudinally in response to an application of force onto cable assembly 205, such as by the load of elevator car 210, 220.

Still referring to FIG. 2, each elevator car 210, 220 may include at least one motion controller 105 operably coupled to pulley system 208, such as, for example, via a wireless connection and/or a wired connection 209. Motion controller 105 may be configured to measure motion data from elevator cars 210, 220 by detecting a relative movement of pulley system 208. In the embodiment, motion controller 105 may measure motion data indicative of a degree of extension and/or stretch of cable assembly 205 during use of elevator cars 210, 22. Each elevator car 210, 220 may further include at least one input device 112 positioned within a cabin of elevator car 210, 220 for receiving a user input from one or more occupants 10 located within the cabin.

Each floor 204A-204D may include one or more call devices 110 and access doors 206 at a location of each elevator shaft 202, 212 on said floor 204A-204D. Access doors 206 may provide accessibility to elevator cars 210, 220 when an elevator door 207 of elevator car 210, 220 is aligned with the respective floor 204A-204D. Call device 110 may be configured to receive a user input from one or more prospective occupants 20 located at one of the plurality of locations on one of floors 204A-204D. For example, call device 110 may be configured to receive a user input indicative of a call requesting transportation via at least one of elevator cars 210, 220. Call device 110 may be configured to transmit the call request to dispatch controller 125, which may include data indicative of a current location within working environment 200 from which the call request originated from (e.g., the first location "A" on first floor 204A). The call request may further include data indicative of a destination location within working environment 200 to which the prospective passenger is seeking transportation to (e.g., fourth floor 204D).

Still referring to FIG. 2, each elevator shaft 202, 212 may include at least one position device 120 in communication with a corresponding motion controller 105. For example, position device 120 may be located in a separate location and/or floor of the building than motion controller 105. In some embodiments, position device 120 may be located in a room within the building (e.g., motor room), or outside of the building entirely. In other embodiments, position device 120 may be positioned within elevator shaft 202, 212. Position device 120 may be configured to detect a positional count of the one or more elevator cars within the respective elevator shaft 202, 212. In some embodiments, position device 120 may include an elevator encoder physically positioned within each elevator shaft 202, 212. Each position device 210 may be in communication with a corresponding motion controller 110 and/or pulley system 208 of the respective elevator shaft 202, 212. In this instance, position device 120 may include a wired connection with motion controller 110 and/or pulley system 208 due to a proximate location of position device 120 within elevator shaft 202, 212.

A positional count of an elevator car may include a numerical representation of a current position of the elevator car relative to the elevator shaft, and particularly a height above a fixed reference point defined by a bottom surface of the elevator shaft. The bottom surface of an elevator shaft may include first floor 204A or a surface located below first floor 204A. The positional count of an elevator car may be referenced by dispatch controller 125 to maintain a real-time indication of the current position of the elevator car within the elevator shaft. As described below, dispatch controller 125 may be configured to reference and compare the positional counts of elevator cars 210, 220 to preprogrammed positional counts of floors 204A-204D (e.g., predefined positional count data 144) to determine a current load of each elevator car 210, 220.

Figure 3:
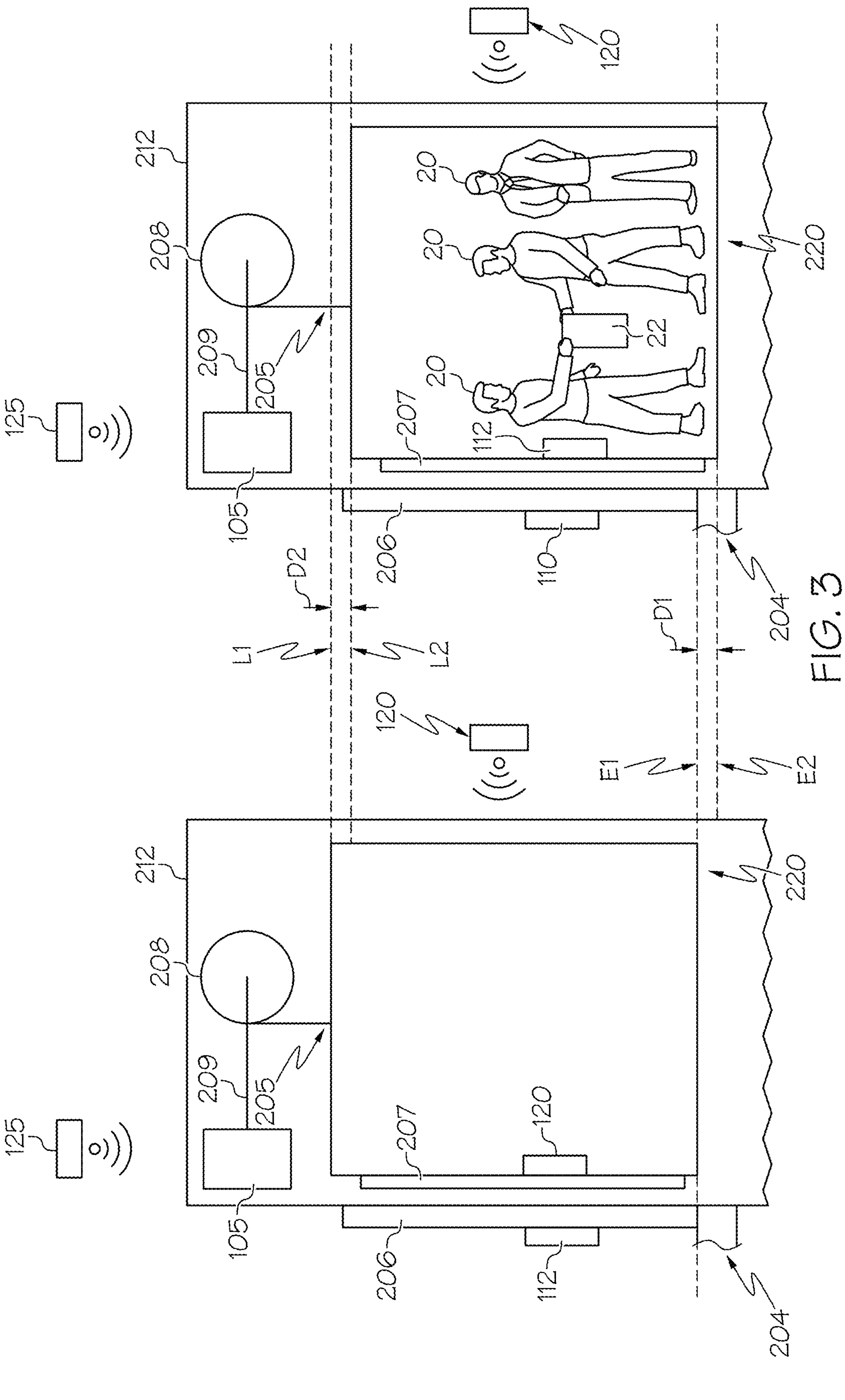
FIG. 3 is a schematic view of an interior of an elevator car from the working environment shown in FIG. 2, with the elevator car moving in response to an increasing occupancy weight.

For example, as seen in FIG. 3, elevator car 220 may be positioned at a first elevation E1 that coincides with an elevation of a first location (e.g., a floor 204) when the cabin of elevator car 220 does not include any occupants 20 and/or objects 22. In this instance, cable assembly 205 may have a first length L1 defined between pulley system 208 and an attachment interface with elevator car 220 (e.g., along a top wall defining the cabin). In response to receiving one or more occupants 20 and/or objects 22 within the cabin, elevator car 220 may be moved to a second elevation E2 that is different from the first elevation E1 (i.e., the elevation of the first location) by an offset distance D1. Stated differently, elevator car 220 may at least partially move (e.g., vertically downward in a direction of gravity) while stopped at one of the floors 204 due to an increase in load of elevator car 220, such as from the presence of one or more occupants 20 and/or objects 22 within the cabin of elevator car 220.

Cable assembly 205 may experience a force applied by the increased load of elevator car 220, thereby causing cable assembly 205 to at least partially stretch. The degree of extension experienced by cable assembly 205 may correspond to the force applied to cable assembly 205 by elevator car 220. Further, an amount of force applied by elevator car 220 may correspond to the current load of elevator car 220, such as at least partially based on an occupancy weight of elevator car 220. Cable assembly 205 may extend to a second length L2 that is greater than the first length L1 when elevator car 220 receives occupants 20 and/or objects 22 in the cabin. In this instance, cable assembly 205 may be stretched by an extended distance D2 defining a difference between the first length L1 and the second length L2.

As described in detail above, position device 120 may be in communication with motion controller 105 via network 115, and may receive motion data corresponding to elevator car 220 from motion controller 105. Position device 120 may be configured to determine the positional count of elevator car 220 based on the motion data of elevator car 220, which may be indicative of the extended distance D2 of cable assembly 205 and the offset distance D1 (i.e. a linear distance separating elevator car 220 from an elevation of floor 204 at which elevator car 220 is located. For example, motion controller 105 may be configured to accommodate a movement of elevator car 220, based on the increased load received in the cabin, by actuating pulley system 208 to move elevator car 220 into realignment with the first elevation E1. The motion data measured and transmitted by motion controller 105 may be correspond to the linear distance that elevator car 220 is moved to reposition elevator car 220 at the first elevation E1. Position device 120 may record such measurements as positional count data and transmit said data (e.g., positional count data 142) for each elevator car 210, 220 to dispatch controller 125 via network 115.

Figure 4:
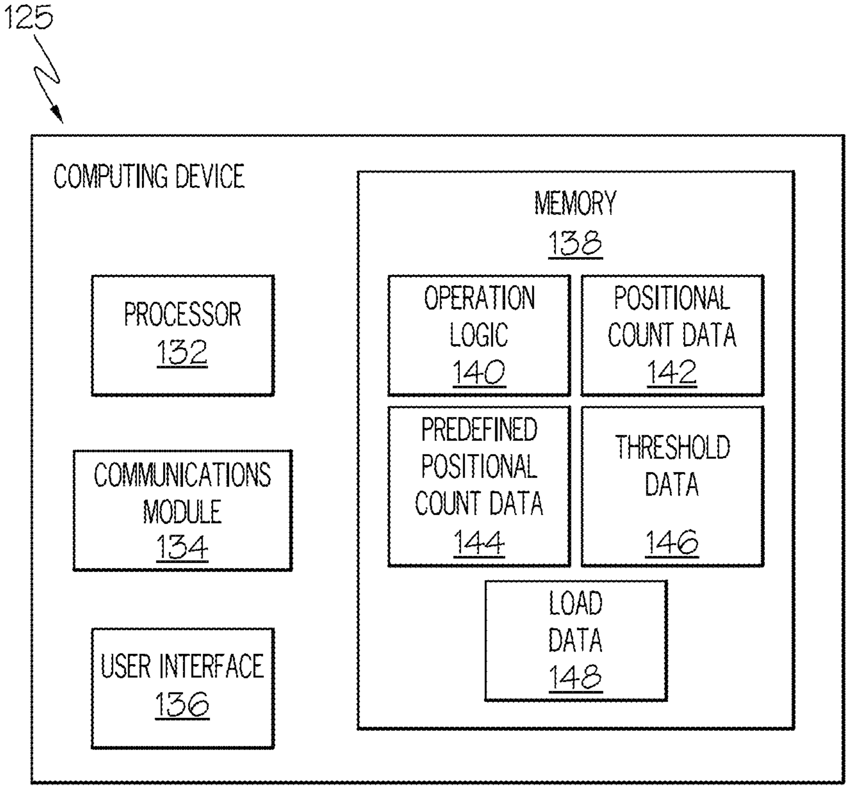
FIG. 4 is a schematic view of hardware components of a computing device from the dispatch system shown in FIG. 1.
Figure 5:
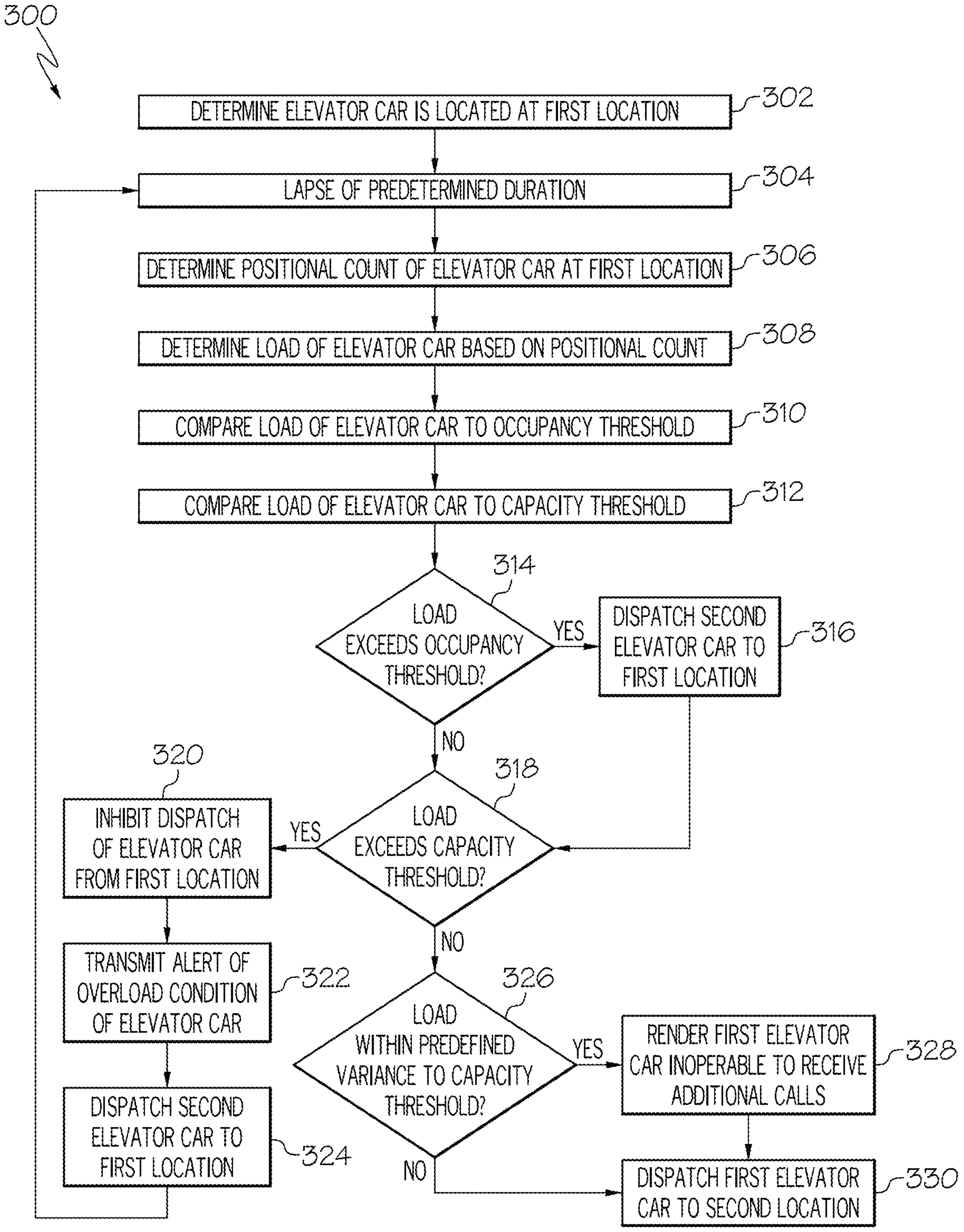
FIG. 5 is a flow diagram of an exemplary method of dispatching elevator cars with the dispatch system shown in FIG. 1.

Referring now to FIG. 4, dispatch controller 125 may include a computing device incorporating a plurality of hardware components that allow dispatch controller 125 to receive data (e.g., motion data, call requests, commands, occupant data, etc.), process information (e.g., occupant capacity), and/or execute one or more processes (see FIG. 5). Illustrative hardware components of dispatch controller 125 may include at least one processor 132, at least one communications module 134, a user interface 136, and at least one memory 138. In some embodiments, dispatch controller 125 may include a computer, a mobile user device, a remote station, a server, a cloud storage, and the like. In the illustrated embodiment, dispatch controller 125 is shown and described herein as a separate device from the other devices of dispatch system 100, while in other embodiments, one or more aspects of dispatch controller 125 may be integrated with one or more of the other devices of dispatch system 100. Stated differently, the illustrative hardware components of dispatch controller 125 shown and described herein may be integral with one or more of motion controller 105, call device 110, input device 112, and/or position device 120.

Processor 132 may include any computing device capable of executing machine-readable instructions, which may be stored on a non-transitory computer-readable medium, such as, for example, memory 138. By way of example, processor 132 may include a controller, an integrated circuit, a microchip, a computer, and/or any other computer processing unit operable to perform calculations and logic operations required to execute a program. As described in detail herein, processor 132 may be configured to perform one or more operations in accordance with the instructions stored on memory 138, such as, for example, operation logic 140. Communications module 134 may facilitate communication between dispatch controller 125 and the one or more other devices of dispatch system 100, such as, for example, via network 115. User interface 136 may include one or more input and output devices, including one or more input ports and one or more output ports. User interface 136 may include, for example, a keyboard, a mouse, a touchscreen, etc., as input ports. User interface 136 may further include, for example, a monitor, a display, a printer, etc. as output ports. User interface 136 may be configured to receive a user input indicative of various commands, including, but not limited to, a command defining and/or adjusting predefined positional count data 144 and/or threshold data 146 stored in memory 138.

Still referring to FIG. 4, memory 138 may include various programming algorithms and data that support an operation of dispatch system 100. Memory 138 may include any type of computer readable medium suitable for storing data and algorithms, such as, for example, random access memory (RAM), read only memory (ROM), a flash memory, a hard drive, and/or any device capable of storing machine-readable instructions. Memory 138 may include one or more data sets, including, but not limited to, motion data received from motion controller 105, positional count data 142 received from position device 120, predefined positional count data 144 for each of the plurality of floors 204A-204D, and load data 148 determined for each of the plurality of elevator cars 210, 220, and the like.

Dispatch controller 125 may be configured to store the positional count data 142 in memory 138, and associate the data with the corresponding predefined positional count data 144 for the location where the elevator car 210, 220 is located to determine the load (i.e. load data 148) of elevator car 210, 220. Load data 148 may include a real-time occupancy weight measurement of each elevator car 210, 220. Memory 138 may further include threshold data 146 that may be preprogrammed and/or adjustable by a user of dispatch system 100, such as, for example, via user interface 136. Threshold data 146 may define one or more tolerance levels for initiating control of the plurality of elevator cars 210, 220 in accordance with the operation logic 140. As described herein, dispatch controller 125 may be configured to control an operation of the plurality of elevator cars 210, 220 in at least one of a plurality of modes (e.g., a dispatch mode, a bypass mode, an overload mode, etc.) based on one or more of the positional count data 142, the predefined positional count data 144, the threshold data 146, and/or the load data 148.

In one example, operation logic 140 may include executable instructions that allow dispatch system 100 to determine a dispatch operation of each elevator car 210, 220 upon receiving occupants from a first location "A." Operation logic 140 may further determine which of the plurality of elevators cars 210, 220 to dispatch in response to receiving a call request at a first location "A" for transportation to a destination location. Operation logic 140 may facilitate determining a mode of operation of each elevator car 210, 220 based on a load of each elevator car 210, 220.

Referring now to FIG. 5, an example method 300 of using dispatch system 100 to control an operation of a plurality of elevator cars based on a current load of the elevator cars is depicted. It should be understood that the steps shown and described herein, and the sequence in which they are presented, are merely illustrative such that additional and/or fewer steps may be included in various arrangements without departing from a scope of this disclosure.

Initially, dispatch system 100 may receive a call request at the first location "A" of a plurality of locations within working environment 200. The call request may be initiated in response to a prospective occupant 20 actuating call device 110 at the first location "A," such as, for example, on fourth floor 204D and adjacent to second elevator shaft 212. Call device 110 may transmit the call request to dispatch controller 125 via network 115, and the call request may include data indicative of the first location "A" from which the call request originated. The call request may further include data indicative of a destination location (e.g., first floor 204A) within working environment 200 to which the prospective occupants 20 seek to travel. At least one of the plurality of elevator cars 210, 220 may be dispatched to fourth floor 204D in response to the call request, such as second elevator car 220.

At step 302, and referring back to FIG. 2, dispatch controller 125 may be configured to determine that second elevator car 220 has arrived to the location of fourth floor 204D. At step 304, dispatch controller 125 may allow a predetermined duration to lapse prior to initiating position device 120 to determine a positional count of elevator car 220 (step 306). Dispatch controller 125 may commence the predetermined duration in reference to one or more time points, such as, for example, when elevator car 220 arrives at fourth floor 204D, when one or more of doors 206, 207 open, etc.

Referring back to FIG. 3, and prior to the prospective occupants 20 entering the cabin of elevator car 220, elevator car 220 may be positioned at the first elevation E1 of fourth floor 204D. Stated differently, an elevation of elevator car 220 relative to elevator shaft 212 may coincide with the first elevation E1 of the first location (e.g. fourth floor 204D). In this instance, the motion data recorded by motion controller 105 may be indicative of cable assembly 205 having the first length L1 given the relative occupancy weight of elevator car 220. The entrance of one or more prospective occupants 20 and/or objects 22 into elevator car 220 during the predetermined duration may cause elevator car 220 to at least partially move relative to elevator shaft 212, given the increased occupancy weight in the cabin.

Upon completion of the predetermined duration at step 304, position device 120 may determine and transmit the positional count of elevator car 220 to dispatch controller 125 in the form of positional count data 142. For example, position device 120 may receive motion data generated at the corresponding motion controller 105 coupled to elevator car 220, and determine the positional count based on the offset distance D1 (defined between the second elevation E2 of elevator car 220 and the first elevation D1 of fourth floor 204D) and/or the extended distance D2 (defined by a difference between the second length L2 and the first length L1 of cable assembly 205).

At step 308, dispatch controller 125 may be configured to determine the current load of elevator car 220 based on the positional count data 142 from position device 120. For example, dispatch controller 125 may compare the positional count of elevator car 220 at the first location (e.g., fourth floor 204D) with the predefined positional count of the first location, as stored in memory 138 in the form of predefined positional count data 144. In the example, dispatch controller 125 may compute the load of elevator car 220 based on the difference between the predefined positional count for fourth floor 204D and the positional count of elevator car 220 at fourth floor 204D. It should be understood that each of the plurality of floors 204A-204D may include a corresponding predefined positional count.

By way of example, the predefined positional count for fourth floor 204D may be approximately 2000 counts. Prior to receiving occupants 20 and/or objects 22 within elevator car 220, position device 120 may determine the positional count of elevator 220 to be approximately 2000 counts. Accordingly, dispatch controller 125 may compare the positional count data 142 to the predefined positional count data 144 for fourth floor 204D and determine elevator car 220 has a 0% load. In contrast, upon receiving occupants 20 and/or objects 22 within the cabin, position device 120 may determine the positional count of elevator 220 to be approximately 1995 counts. In this instance, dispatch controller 125 may determine elevator car 220 to have a 50% load. By further example, dispatch controller 125 may determine that elevator car 220 has a 90% load when position device 120 determines the positional count of elevator car 220 to be 1990 counts at fourth floor 204D.

Still referring to FIG. 5, at step 310, dispatch controller 125 may be configured to compare the current load of elevator car 220 to the threshold data 146, and particularly at least a location occupancy threshold of the first location (e.g., fourth floor 204D). The location occupancy threshold may define a load measurement that is indicative of a need for additional elevator cars to be parked at the first location for receiving prospective occupants 20 located at the floor. Stated differently, dispatch controller 125 may determine that the current load within elevator car 220 signifies a likelihood that additional occupants 20 may be located at the first location, and who may require transportation via one or more additional elevator cars.

At step 312, dispatch controller 125 may further compare the current load of elevator car 220 to a cabin capacity threshold of elevator car 220. The cabin capacity threshold may define a load measurement that is indicative of a need for additional elevator cars to be moved to the first location for receiving prospective occupants 20 presently located within the cabin of elevator car 220. In other words, the cabin capacity threshold defines a maximum load tolerance of elevator car 220 such that additional elevator cars are required to transport the excess occupants 20 received within elevator car 220. It should be appreciated that dispatch controller 125 may store a plurality of thresholds values (threshold data 146) in memory 138 for each of the plurality of elevator cars in the building, and the plurality of elevator cars may have similar and/or varying capacities relative to one another based on at least a size of the elevator car.

At step 314, dispatch controller 125 may be configured to determine whether the current load of elevator car 220 exceeds the location occupancy threshold of fourth floor 204D. In response to determining the current load of elevator car 220 exceeds the location occupancy of fourth floor 204D, dispatch controller 125 may be configured to dispatch at least a second elevator car (e.g., elevator car 210) to the first location. In this instance, dispatch controller 125 may determine that additional prospective occupants 20 may be located on fourth floor 204D, such that additional call requests to dispatch system 100 may be received from fourth floor 204D.

Accordingly, at step 316, dispatch controller 125 may control an operation of at least one elevator car (e.g., elevator car 210) in accordance with an overload mode (operation logic 140) by dispatching and parking elevator car 210 at the first location in anticipation of a call request being received from a prospective occupant 20 at said floor. In some embodiments, one or more (e.g., a plurality) elevator cars may be dispatched to the first location based on the extent to which the current load is determined to exceed the location occupancy threshold at step 314.

At step 318, upon dispatching at least a second elevator car to the first location (step 316) and/or in response to the load of elevator car 220 not exceeding the location occupancy threshold (step 314), dispatch controller 125 may be configured to determine whether the current load of elevator car 220 exceeds the cabin capacity threshold of elevator car 220. In response to determining the current load exceeds the cabin capacity threshold, dispatch controller 125 may be configured to inhibit dispatch of elevator car 220 from the first location at step 320. In this instance, dispatch controller 125 may determine that the number of occupants 20 and/or objects 22 present within the cabin of elevator car 220 is beyond a safety tolerance level. Dispatch controller 125 may control an operation of elevator car 220 in accordance with an overload mode (operation logic 140) by preventing further operation of elevator car 220.

At step 322, dispatch controller 125 may transmit a message to the cabin of elevator car 220 (e.g., via input device 112) notifying the occupants of the overload condition. The message may further instruct one or more occupants 20 within elevator car 220 to exit the cabin. In other embodiments, step 322 may be omitted entirely.

At step 324, dispatch controller 125 may dispatch at least one elevator car to the first location to receive the occupants 20 exiting elevator car 220. In some embodiments, one or more (e.g., a plurality) elevator cars may be dispatched to the first location based on the extent to which the current load is determined to exceed the cabin capacity threshold at step 318. By way of example, the cabin capacity threshold may range from about 80% to 90% of a maximum allowable load of elevator car 220. Upon dispatching at least a second elevator car to the first location (step 326), dispatch controller 125 may allow the predetermined duration to lapse at step 304 prior to reassessing the positional count of elevator car 220 at step 306.

At step 326, in response to the load of elevator car 220 not exceeding the cabin capacity threshold (step 318), dispatch controller 125 may be configured to determine whether the current load of elevator car 220 is within a predefined variance (threshold data 146) to the cabin capacity threshold. In response to determining the load is within the predefined variance to the threshold, dispatch controller 125 may control an operation of elevator car 220 in accordance with a bypass mode (operation logic 140) by rendering elevator car 220 inoperable to receive call requests from prospective occupants 20 at other locations (e.g., floors 204A-204C). Dispatch controller 125 may determine that the current load does not exceed a safety load tolerance for elevator car 220 to require ceasing operation of the elevator car completely, however, the current load is great enough to prevent further occupants 20 from entering elevator car 220.

Dispatch controller 125 may allow elevator car 220 to operate in accordance with the bypass mode in which call requests from other locations are disregarded by elevator car 220 until the load within the cabin is reduced beyond the predefined variance from the cabin capacity threshold. By way of example, the predefined variance may range from about 1.0% to about 10.0% of the cabin capacity threshold. Alternatively, in response to determining the load is not within the predefined variance to the threshold at step 326, dispatch controller 125 may control an operation of elevator car 220 in accordance with a dispatch mode of the operating logic 140. In this instance, dispatch controller 125 may dispatch elevator car 220 from the first location to a second location based on the destination inputs received from the prospective occupants 20 within the cabin.

All technical and scientific terms used herein have the same meaning as commonly understood to one of ordinary skill in the art to which this disclosure belongs unless clearly indicated otherwise. As used herein, the singular forms "a", "an", and "the" include plural references unless the context clearly dictates otherwise.

The above description is illustrative and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description.

What is claimed is:

1. A method for dispatching an elevator car, the method comprising:

determining the elevator car is located at a first location of a plurality of locations, wherein a predefined positional count corresponds to each of the plurality of locations, each of the predefined positional counts defining an elevational position for each of the plurality of locations;

determining a positional count of the elevator car at the first location after waiting a predetermined duration from when the elevator car arrives to the first location, the positional count defining a first elevational position of the elevator car at the first location;

determining a load of the elevator car at the first location based on a difference between the positional count and the predefined positional count corresponding to the first location, the difference corresponding to an offset distance between the elevational position of the first location and the first elevational position of the elevator car; and controlling an operation of the elevator car based on the load of the elevator car at the first location.

2. The method of claim 1, wherein determining the positional count of the elevator car at the first location comprises:

determining the offset distance between the first elevational position of the elevator car from the elevational position of the first location in response to movement of the elevator car after the predetermined duration.

3. The method of claim 2, wherein the offset distance includes a linear distance separating the elevator car from the elevational position of the first location when the elevator car is located at the first location.

4. The method of claim 3, wherein a lift mechanism is coupled to the elevator car and configured to move the elevator car relative to the plurality of locations, wherein the linear distance corresponds to an extension of the lift mechanism when the elevator car is located at the first location.

5. The method of claim 1, wherein prior to controlling the operation of the elevator car, the method comprises:

comparing the load of the elevator car at the first location to a first threshold defining a location occupancy at the first location and a second threshold defining a capacity tolerance of the elevator car.

6. The method of claim 5, wherein operation of the elevator car includes a dispatch mode when the load of the elevator car does not exceed the first threshold and the second threshold.

7. The method of claim 6, further comprising:

dispatching the elevator car from the first location to a second location of the plurality of locations when the elevator car is in the dispatch mode.

8. The method of claim 5, wherein operation of the elevator car includes an overload mode when the load of the elevator car exceeds the first threshold and the second threshold.

9. The method of claim 8, further comprising:

ceasing dispatch of the elevator car from the first location to a second location of the plurality of locations when the elevator car is in the overload mode; and dispatching at least a second elevator car to the first location.

10. The method of claim 9, further comprising:

transmitting an alert indicative of the overload mode to the elevator car.

11. The method of claim 5, wherein operation of the elevator car includes a bypass mode when the load of the elevator car exceeds the first threshold and does not exceed the second threshold.

12. The method of claim 11, further comprising:

dispatching the elevator car from the first location to a second location of the plurality of locations;

rendering the elevator car inoperable for receiving additional load such that the elevator car is disregarded from call requests for the elevator car; and dispatching at least a second elevator car to the first location.

13. The method of claim 12, further comprising:

determining the elevator car is located at the second location;

determining a positional count of the elevator car at the second location;

determining the load of the elevator car at the second location; and reassessing the operation of the elevator car based on the load of the elevator car at the second location.

14. A system for dispatching an elevator car, comprising:

at least one position device operably coupled to each of a plurality of elevator cars, the at least one position device is configured to determine a positional count of each of the plurality of elevator cars in response to being located at one of the plurality of locations for a predetermined duration, the positional count defining an elevational position of each of the plurality of elevator cars when located at one of the plurality of locations;

at least one dispatch controller preprogramed with a predefined positional count corresponding to each of the plurality of locations, each of the predefined positional counts defining an elevational position of the plurality of locations; and the at least one dispatch controller operably coupled to each of the at least one position device of the plurality of elevator cars, the at least one dispatch controller is configured to:

determine a load of a first elevator car of the plurality of elevator cars based on a difference between the positional count of the first elevator car and the predefined positional count corresponding to a first location in response to the first elevator car being located at the first location of the plurality of locations, the difference corresponding to an offset distance between the elevational position of the first location and the elevational position of the first elevator car; and control an operation of the first elevator car based on the load of the first elevator car in response to being located at the first location.

15. The system of claim 14, wherein the at least one dispatch controller is configured to:

compare the load of the first elevator car at the first location to a threshold defining a capacity tolerance for the first elevator car; and determine the operation of the first elevator car based on a comparison of the load to the threshold.

16. The system of claim 15, wherein the at least one dispatch controller is configured to:

determine the operation of the first elevator car, the operation including a dispatch mode when the load of the first elevator car is less than the threshold; and control the first elevator car based on the dispatch mode by dispatching the first elevator car from the first location to a second location of the plurality of locations.

17. The system of claim 15, wherein the at least one dispatch controller is configured to:

determine the operation of the first elevator car, the operation including an overload mode when the load of the first elevator car is greater than the threshold; and control the first elevator car based on the overload mode by inhibiting dispatch of the first elevator car from the first location.

18. The system of claim 15, wherein the at least one dispatch controller is configured to:

determine the operation of the first elevator car, the operation including a bypass mode when the load of the first elevator car is equal to or less than the threshold by a predefined variance;

control the first elevator car based on the bypass mode by dispatching the first elevator car from the first location to a second location of the plurality of locations; and render the first elevator car inoperable to receive additional call requests from the plurality of locations.

19. A system for dispatching a plurality of elevator cars, comprising:

a processor; and a memory storing instructions that, when executed by the processor, causes the processor to perform operations including:

determine a first elevator car of the plurality of elevator cars is located at a first location of a plurality of locations, wherein each of the plurality of locations includes a corresponding predefined positional count that defines an elevational position of each of the plurality of locations;

determine a positional count of the first elevator car at the first location after a predetermined duration from when the first elevator car arrives at the first location, the positional count defining a first elevational position of the first elevator car at the first location;

determine a load of the first elevator car based on a difference between the positional count and the predefined positional count corresponding to the first location, the difference corresponding to an offset distance between the elevational position of the first location and the first elevational position of the first elevator car; and operate the first elevator car based on the load of the first elevator car at the first location.

* * * * *